United States Patent [19]

Bier

[11] Patent Number: 5,595,789
[45] Date of Patent: Jan. 21, 1997

[54] COATED POLYCARBONATE MOULDED PARTS

[75] Inventor: Peter Bier, Krefeld, Germany

[73] Assignee: Bayer AG, Leverkusen, Germany

[21] Appl. No.: 516,820

[22] Filed: Aug. 18, 1995

[30] Foreign Application Priority Data

Sep. 2, 1994 [DE] Germany .................. 44 31 217.2

[51] Int. Cl.$^6$ ...................................... B05D 3/06
[52] U.S. Cl. ...................... 427/493; 427/515; 427/519; 427/520; 427/386; 427/387; 427/393.5
[58] Field of Search ................... 427/393.5, 493, 427/515, 517, 519, 520, 386, 387

[56] References Cited

U.S. PATENT DOCUMENTS 3,714,289  1/1973  Schober et al. .................. 260/830 P
4,755,588  7/1988  Vallance et al. ...................... 528/371

FOREIGN PATENT DOCUMENTS 0524524  1/1993  European Pat. Off. .
580046   1/1994  European Pat. Off. .

OTHER PUBLICATIONS

Orbit Abstract of EP 0 524 524 (Jan. 27, 1993).

Primary Examiner—Shrive Beck
Assistant Examiner—Erma Cameron
Attorney, Agent, or Firm— Connolly & Hutz

[57] ABSTRACT

Method for coating polycarbonate moulded parts whereby, to the surface of a moulded body composed of a polycarbonate based on a cycloaliphatic diphenol, a coating material which possesses as cross-linkable components agents having acrylate, allyl, epoxide, silanol, isocyanate, anhydride, melamine functional groups or combinations thereof, is applied in a thickness of from 0.5 to 200 μm and is cured thermally and/or by irradiation, with the addition of thermally or photochemically curing catalysts being possible.

8 Claims, No Drawings

COATED POLYCARBONATE MOULDED PARTS

Moulded parts made from polycarbonates are distinguished by transparency, high impact strength, high heat deflection temperature and dimensional stability. In order that these parts should better withstand external influences, they are often provided with a coating surface layer. This is done preferably by painting. For the coated parts to be suitable for use, particularly over a prolonged period, an adequate adhesion between the surface layer and the substrate is necessary.

It has been found that an especially good adhesion between the polycarbonate moulded parts and the surface layer is obtained when particular polycarbonates are employed as the substrate.

The invention relates to a method for coating particular polycarbonates having a high heat deflection temperature, wherein the resulting coating exhibits a particularly good adhesion to the substrate and at the same time excellent optical properties, in particular transparency.

The invention provides a method for coating polycarbonate moulded parts, which is characterised in that to the surfaces of a moulded body composed of a polycarbonate (A) based on a diphenol of formula (Ia)

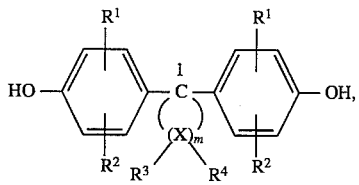

wherein $R^1$ and $R^2$ independently of one another signify hydrogen, halogen, preferably chlorine or bromine, $C_1$–$C_8$ alkyl, $C_5$–$C_6$ cycloalkyl, $C_6$–$C_{10}$ aryl, preferably phenyl, and $C_7$–$C_{12}$ aralkyl, preferably phenyl-$C_1$–$C_4$ alkyl, in particular benzyl, m signifies 4 or 5, $R^3$ and $R^4$ are individually selectable for each X and independently of one another signify hydrogen or $C_1$–$C_6$ alkyl and X signifies carbon, with the proviso that, on at least one atom X, $R^3$ and $R^4$ simultaneously signify alkyl, a coating material (B), which possesses as cross-linkable components agents having acrylate, allyl, epoxide, silanol, isocyanate, anhydride, melamine functional groups or combinations thereof, is applied in a thickness of from 0.5 to 200 μm and is cured thermally and/or by irradiation, with the addition of thermally or photochemically curing catalysts being possible. Thermal curing is carried out preferably at from 130° C. to 220° C.

The invention also provides the moulded bodies thus obtained. The polycarbonates (A) are high-molecular, thermoplastic, aromatic polycarbonates having molecular weights $\overline{M}_w$ (weight average) of at least 10,000, preferably of from 20,000 to 300,000, which contain the bifunctional carbonate structural units of formula (I)

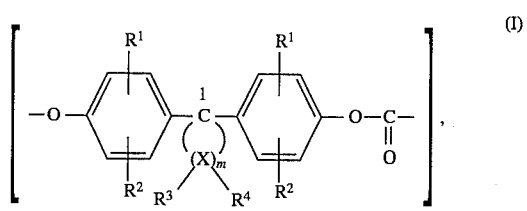

wherein $R^1$ and $R^2$ independently of one another signify hydrogen, halogen, preferably chlorine or bromine, $C_1$–$C_8$ alkyl, $C_5$–$C_6$ cycloalkyl, $C_6$–$C_{10}$ aryl, preferably phenyl, and $C_7$–$C_{12}$ aralkyl, preferably phenyl-$C_1$–$C_4$ alkyl, in particular benzyl, m signifies 4 or 5, $R^3$ and $R^4$ are individually selectable for each X and independently of one another signify hydrogen or $C_1$–$C_6$ alkyl and X signifies carbon, with the proviso that, on at least one atom X, $R^3$ and $R^4$ simultaneously signify alkyl.

These polycarbonates and the underlying dihydroxydiphenylcycloalkanes of formula (I) and the preparation of both products are described in detail in EP 359 953. The dihydroxydiphenylcycloalkanes of formula (I) are starting materials for the polycarbonates (A). C1 designates the diphenyl-substituted carbon atom, hereinafter in the specification and in the claims. In this formula (I) the preferred alkyl radical is methyl; the X atoms in the α-position to the diphenyl-substituted C atom (C1) are preferably not dialkyl-substituted, whereas alkyl disubstitution in the β-position to C1 is preferred.

Dihydroxydiphenylcycloalkanes having rings of 5 and 6 C atoms in the cycloaliphatic radical (m=4 or 5 in formula Ia) are preferred, for example the diphenols of formulae (Ib) to (Id)

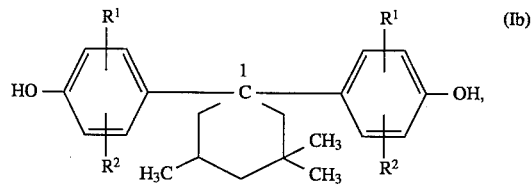

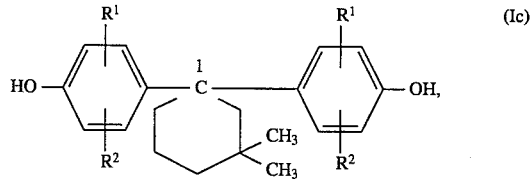

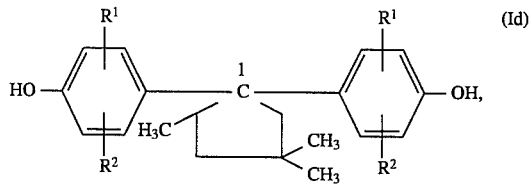

with the 1,1-bis(4-hydroxyphenyl)-3,3,5-trimethylcyclohexane (formula Ib having $R^1$ and $R^2$ equal to H) being particularly preferred.

One diphenol of formula (Ia) may be used, with the formation of homopolycarbonates, or several diphenols of formula (Ia) may be used, with the formation of copolycarbonates.

Furthermore the diphenols of formula (Ia) may also be used mixed with other diphenols, for example with those of formula (Ie)

HO—Z—OH  (Ie), for the preparation of high-molecular, thermoplastic, aromatic polycarbonates.

Other suitable diphenols of formula (Ie) are those wherein Z is an aromatic radical having 6 to 30 C atoms, which can contain one or more aromatic rings, can be substituted and can contain as bridges aliphatic radicals or cycloaliphatic radicals different from those in formula (Ia) or hetero atoms.

Particularly preferred diphenols of formula (Ie) are, for example:

2,2-bis(4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane and 1,1-bis(4-hydroxyphenyl)-cyclohexane.

The molar ratio of diphenols of formula (Ia) to the other diphenols of formula (Ie) optionally used concomitantly is to be between 100 mol-% of (Ia) to 0 mol-% of (Ie) and 2 mol-% of (Ia) to 98 mol-% of (Ie), preferably between 100 mol-% of (Ia) to 0 mol-% of (Ie) and 5 mol-% of (Ia) to 95 mol-% of (Ie), particularly between 100 mol-% of (Ia) to 0 mol-% of (Ie) and 10 mol-% of (Ia) to 90 mol-% of (Ie), and most particularly between 100 mol-% of (Ia) to 0 mol-% of (Ie) and 20 mol-% of (Ia) to 80 mol-% of (Ie).

The high-molecular polycarbonates made from the diphenols of formula (Ia), optionally in combination with other diphenols, can be prepared by all the known methods for the preparation of polycarbonates. Here the different diphenols can be linked to one another both statistically and in blocks.

The polycarbonates can be branched in a manner known per se by condensing small quantities, preferably quantities of between 0.05 and 2.0 mol-% (referred to diphenols used), of trifunctional or more than trifunctional compounds, particularly those having three or more than three phenolic hydroxyl groups. Examples of some branching agents having three or more than three phenolic hydroxyl groups are: phloroglucinol, 4,6-dimethyl-2,4,6-tri (4-hydroxyphenyl)heptene-2, 4,6-dimethyl-2,4,6-tri (4-hydroxyphenyl) heptane, 1,3,5-tri(4-hydroxyphenyl)benzene, 1,1,1- tri(4-hydroxyphenyl)ethane, tri(4-hydroxyphenyl)phenylmethane, 2,2 -bis[4,4-bis (4-hydroxyphenyl)cyclohexyl]propane, 2,4-bis(4-hydroxyphenylisopropyl)phenol, 2,6-bis(2-hydroxy-5-methylbenzyl)-4-methylphenol, 2-(4-hydroxyphenyl)-2-(2,4-dihydroxyphenyl)propane, hexa[4-(4-hydroxyphenylisopropyl)phenyl]orthoterephthalate, tetra(4-hydroxyphenyl)methane, tetra [4-(4-hydroxyphenylisopropyl)phenoxy]methane and 1,4-bis [4,4"-dihydroxytriphenyl)methyl]benzene.

Some other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Monofunctional compounds are used in conventional concentrations as chain stoppers for the known per se control of the molecular weight of the polycarbonates A. Suitable compounds are, for example, phenol, tert.-butylphenols or other alkyl-$C_1$-$C_7$-substituted phenols. Small quantities of phenols of formula (If)

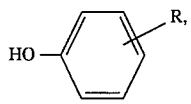  (If)

wherein

R represents a branched $C_8$ alkyl and/or $C_9$ alkyl radical are particularly suitable for controlling the molecular weight.

In the alkyl radical R the proportion of $CH_3$ protons is preferably between 47 and 89% and the proportion of CH— and $CH_2$ protons is preferably between 53 and 11%; also R is preferably in the o-position and/or p-position to the OH group, and particularly preferably the upper limit of the ortho-proportion is 20%. The chain stoppers are employed generally in quantities of from 0.5 to 10 mol-%, preferably from 1.5 to 8 mol-%, referred to the diphenols used. For further details reference is made to EP 395 953.

The polycarbonates (A) can be prepared in a manner known per se, preferably by the phase interface method (cf. H. Schnell, "Chemistry and Physics of Polycarbonates", Polymer Reviews, Vol. IX, pages 33 ff., Interscience Publ. 1964).

The polycarbonates (A) can be prepared by the known method in homogeneous phase, by the so-called "pyridine method" as well as by the known melt transesterification method using, for example, diphenyl carbonate instead of phosgene.

The polycarbonates have a high heat deflection temperature owing to the incorporation of diphenols of formula (Ia).

The particularly preferred polycarbonates A are those containing units of the formula (Ig)

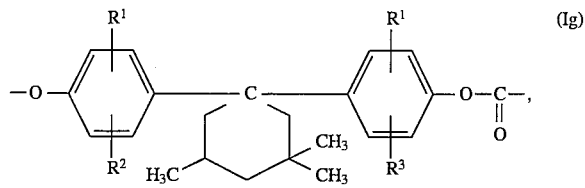  (Ig)

wherein $R^1$ and $R^2$ have the meanings given for formula (I), but which are particularly preferably hydrogen.

In addition to a high heat deflection temperature, the polycarbonates have a good UV-stability and good flow properties in the melt.

Through the optional combination with other diphenols, particularly with those of formula (Ie), the properties of the polycarbonates may moreover be varied advantageously. In copolycarbonates of this kind, the diphenols of formula (Ia) are contained in the polycarbonates in quantities of from 100 mol-% to 2 mol-%, preferably in quantities of from 100 mol-% to 5 mol-%, particularly in quantities of from 100 mol-% to 10 mol-% and most particularly from 100 mol-% to 20 mol-%, referred to the total quantity of 100 mol-% of diphenol units.

Coating materials

Suitable coating materials (B) are coating systems whereof the cross-linking components contain acrylate, allyl, epoxy, silanol, isocyanate, anhydride, melamine functional groups or combinations thereof. Comprehensive descriptions of these coating systems may be found in: "Lehrbuch der Lacke und Beschichtungen", editor: Dr. Hans Kittel, Verlag W. A. Colomb in H. Heenemann GmbH, Stuttgart, Berlin; in "Lackkunstharze" by Hans Wagner and Hans Friedrich Sarx at Carl Hanser Verlag, Munich 1971; specifically for epoxy resins in: "Epoxy Resins, Chemistry and Technology" edited by Clayton A. May and Yoshio Tanaka at Marcel Dekker, Inc., New York 1973, Chapter 7, pages 451 ff.

EXAMPLES

A. Polycarbonate moulded bodies coated with an acrylic coating 3 mm thick plates (105×150×3 mm) of a copolycarbonate based on the diphenol Ib and on bisphenol A (APEC HT KU 1-9350) having Tg=185° C., and for comparison a polycarbonate based on bisphenol A (MAKROLON 3108) having Tg=148° C. were purified using isopropanol and by means of a mechanical device were dipped into the following mixture and steadily withdrawn from the mixture over a period of 120 sec. The plates coated in this manner were then mounted in a frame and were each cured once under nitrogen from the upper and under side by means of UV irradiation [UV irradiation unit with medium-pressure mercury-arc lamp (power: 80 W/cm)].

Both APEC HT and MAKROLON are trademarks that are identified with products of Bayer AG.

Mixture 80 parts by weight Coating mixture A
20 parts by weight hexanediol diacrylate
5 parts by weight N-vinylpyrrolidone
3 parts by weight 2,2-dimethyl-2-phenylacetophenone Coating mixture A 314.8 g of hydroxyethyl acrylate
768 g of hexanediol bisacrylate
0.5 g of di-tert.-butylhydroquinone
0.25 g of dibutyltin dilaurate were placed in a 2 l round-necked flask equipped with stirrer, internal thermometer and gas inlet tube.

Then 453.1 g of a polyisocyanate based on hexamethylene diisocyanate, containing as the main component biuret made from three molecules of hexamethylene diisocyanate, were added dropwise at 40° to 45° C. and with dry air being passed through. After dropwise addition was complete, the reaction mixture was heated at 60° to 65° C. until the NCO number had fallen to below 0.1%, which generally occurred after 6 hours.

To assess the adhesion of the coating and its resistance to weathering, a cross-cut adhesion test was carried out by inscribing in the coating a set of 6×6 lines each at a distance apart of 1 mm with subsequent application and rapid peeling off of an adhesive tape. The classification into grades 0 to 5 was then made in accordance with DIN 53 151.

The following values were obtained:

| Example | Grade Unweathered | Grade after 1000 hours Xenon WOM | Grade after 3000 hours Xenon WOM |
|---|---|---|---|
| Apec HT KU 1-9350 | 0 | 0 | 0 |
| Comparison Makrolon 3108 | 0 | 1 | 3 |

B. Polycarbonate moulded bodies coated with an epoxy coating

Coating compositions according to EP-A 0 524 524 are used as examples of epoxy coatings.

The compounds, which contain epoxy rings and are free from OH groups, are aliphatic epoxy compounds and cycloaliphatic epoxy compounds. The number of epoxy rings is between 1 and 6, preferably between 1 and 3.

Examples of aliphatic epoxy compounds are those of formula (B 1)

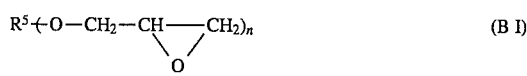

wherein is an integer from 1 to 6, preferably from 1 to 3 and $R^5$ represents an n-valent $C_1$–$C_{15}$ alkane or an n-valent $C_6$–$C_{36}$ aromatic compound.

Examples of $C_1$–$C_{15}$ alkanes $R^5$ are methane, ethane, propane, butane, isobutane, the isomeric pentanes, hexanes, octanes, decanes, dodecanes and pentadecanes.

Examples of $C_6$–$C_{36}$ aromatic compounds are benzene, naphthalene, anthracene, alkyl-substituted benzenes, halogen-substituted benzenes, optionally alkyl-substituted diphenyls as well as compounds of the formula (B 1¹)

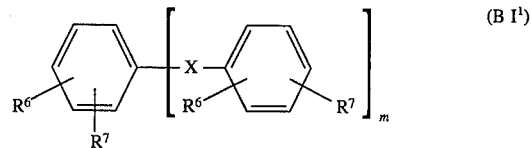

wherein m is 1 or 2 and $R^6$ and $R^7$ independently of one another represent H, Br, Cl, $CH_3$ or $C_2H_5$ and X represents a bridging atom or group such as —O—, —S—, —$SO_2$—, —CO—, a $C_1$–$C_5$ alkylidene or a $C_3$–$C_{10}$ cycloalkylidene.

Preferred $C_1$–$C_5$ alkylidenes are methylene and isopropylidene, preferred $C_3$–$C_{10}$ cycloalkylidenes are cyclopentylidene and cyclohexylidene as well as alkyl-substituted cyclopentylidenes and cyclohexylidenes such as 3,5,5-trimethylcyclohexylidene and 2,4,4-trimethylcyclopentylidene.

These epoxy compounds corresponding to formula (B 1) are known in the literature (see, for example, U.S. Pat. No. 3,018,262 or "Handbook of Epoxy Resins", Lee and Neville, McGraw-Hill Book Co., New York 1967), or they are obtainable by known methods, for example, by reacting a polyhydric phenol, for instance a diphenol, with epichlorohydrin.

An example is the bis-epoxidised propoxyether of bisphenol A corresponding to the following formula

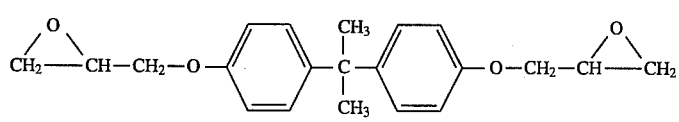

Further examples of aliphatic epoxy compounds are octadecylene oxide, epichlorohydrin, dipentene dioxide, glycidol and styrene oxide.

Examples of cycloaliphatic epoxy compounds are epoxycyclohexane carboxylates such as 3,4-epoxycyclohexylmethyl-3,4-epoxycyclohexane carboxylate, 3,4-epoxy-2-methylcyclohexylmethyl-3,4-epoxy-2-methylcyclohexane carboxylate, bis(3,4-epoxy-6-methylcyclohexylmethyl)adipate. These compounds containing epoxy rings are described in U.S. Pat. No. 3,117,099. Other examples are vinylcyclohexene oxide and bis(2,3-epoxycyclopentyl)ether.

Photoinitiators appropriate as component D) are those which can polymerise epoxides.

Examples of suitable photoinitiators are those which on being subjected to UV irradiation liberate a Lewis acid, which can initiate the polymerisation of the epoxy rings.

These photoinitiators are known and can be prepared in a known manner (J. Am. Chem. Soc. 91 (1969), 145; J. Org. Chem. 35 (1970), 2532; U.S. Pat. No. 2,807,648; Bull. Chem. Belg. 73 (1964), 546; J. Am. Chem. Soc. 51 (1929), 2587).

The photoinitiators suitable according to the invention belong to the class of the onium salts and can be classified into three groups, namely, the halonium photoinitiators, the onium photoinitiators containing elements of group VIa of the periodic table of the elements—for example, the sulphonium initiators—and thirdly, the phosphonium photoinitiators.

Onium salts of the said kind as photoinitiators are known, for example, from U.S. Pat. Nos. 4,026,707, 3,981,897 and 4,069,055. Typical and frequently used representatives are, for example:

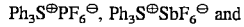

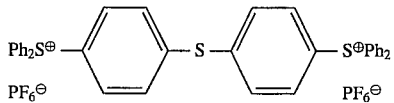

Suitable sensitisers appropriate for use as component, E) according to the invention are known (see, for example, Kirk-Othmer, Encyclopedia, Vol. 2, pages 194 to 197, 2nd edition, John Wiley & Sons, 1965).

Typical examples of these are: 4,4'-(bis-dimethylamino)benzophenone, benzoflavin, thioxanthone, aminoxanthene, acridine yellow.

The components are mixed by conventional methods, for example, at room temperature excluding the action of direct light.

The conventional additives for polycarbonate coatings, such as stabilisers, UV absorbers, dyes, can be admixed to the mixtures to be used according to the invention, during or after preparation of the latter, in quantities such that the photopolymerisation and the transparency of the coatings are not impaired.

The coating of polycarbonate moulded bodies according to the invention can be carried out by conventional methods, for example, by dipping, spraying, spin coating or rolling the polycarbonate moulded bodies. Spraying and dipping processes are particularly suitable.

The curing of the coatings is initiated, for example, by UV irradiation, for which commercially available UV radiators are used, and can be followed by annealing of the coatings.

The coated polycarbonate moulded bodies can also be heated prior to curing, possibly using an UV radiator, and can then be cured at an elevated temperature by means of UV irradiation.

The coating composition described in the following examples was applied by means of a spin-coater to plates having the dimensions 105×150×3 mm and made of a copolycarbonate based on the diphenol Ib and on bisphenol A (Apec HT KU 1-9350 having Tg=185° C., from Bayer AG) or, for comparison, made of a polycarbonate based on bisphenol A (Makrolon 3108 having Tg=148° C. from Bayer AG). The speed of rotation was varied so that the layer thickness after curing was between 5 and 10 μm. Curing was carried out using an UV irradiation unit from the firm IST, Type 200-11-1-Tr.

The tape speed was 2 m/min. Annealing subsequently took place. Directly after UV irradiation the coating compositions, unless stated otherwise, are tack-free but not yet scratch-resistant.

Coating composition

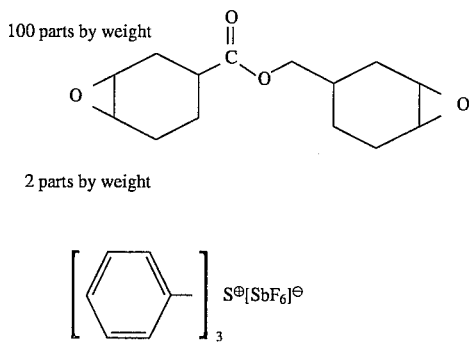

The following values were obtained:

| Example | Substrate | Annealing | Grade Un-weathered | Grade 100 h weathered |
|---|---|---|---|---|
| 1 | Apec HT KU 1-9350 | 130° C./30 min | 0 | 1 |
| 2 | Apec HT KU 1-9350 | 160° C./10 min | 0 | 0 |
| 3 | Makrolon 3108 | 130° C./30 min | 1 | 3 |

C . Polycarbonate moulded bodies, coated with silicone varnish

Silicone varnishes are essentially thermally curing coatings which undergo cross-linking preferably by a condensation reaction to form —Si—O—Si— linkages. Other cross-linking mechanisms can also proceed in parallel to this. Such coating systems are described in the U.S. Pat. Nos. 3,790,527, 3,865,755, 3,887,514, 4,243,720, 4,278,804, 4,680,232, 4,006,271, 4,476,281, in DE-AS 4 011 045, 4 122 743, 4 020 316, 3 917 535, 3 706 714, 3 407 087, 3 836 815, 2 914 427, 3 135 241, 3 134 777, 3 100 532, 3 151 350, in DE-OS 3 005 541, 3 014 411, 2 834 606, 2 947 879, 3 016 021.

Coating compositions according to DE-OS 2 914 427 are used as an example of a polysilicone varnish. The coating materials consist of:

A) from 10 to 40% by weight, referred to the total weight of the coating material, of a partly hydrolysed siloxane compound, which is obtained by hydrolysis in water at about 50° to 80° C. over a period of from about 1 to 12 hours of at least one of the following compounds:

(a) a hydrocarbon trialkoxysilane of the formula R'Si(OR")$_3$, wherein R' signifies an alkyl group having 1 to 4 carbon atoms, a phenyl group or vinyl group, and R" signifies an alkyl group having 1 to 4 carbon atoms, and/or (b) cocondensation products of (a) and from 1 to 40% by weight of a phenyltrialkoxysilane or vinyltrialkoxysilane, wherein the alkoxy group contains 1 to 4 carbon atoms, and/or (c) cocondensation products of 1 mol of (a) and from 0.05 to 1 mol of tetraalkoxysilane, wherein the alkoxy group contains 1 to 4 carbon atoms, and/or (d) cocondensation products of 1 mol of (a) and from 0.05 to 1 mol of dialkyldialkoxysilane, wherein the alkyl and alkoxy groups contain from 1 to 4 carbon atoms, B) from 0 to 40% by weight, referred to the total weight of the coating material, of an aqueous dispersion of colloidal silicon dioxide, C) from 0 to 5% by weight, referred to the total weight of the coating material, of an etherified methylolmelamine, D) from 0.5 to 30% by weight, referred to the total weight of the coating material, of acetic acid, and E) an inert organic solvent, characterised in that the coating material contains in addition 0.05 to 15% by weight, referred to the total weight of the coating material, of a blocked polyisocyanate.

The hydrocarbon trialkoxysilanes (1) are functional siloxane compounds of the formula $R'Si(RO'')_3$, wherein $R'$ signifies an alkyl group having 1 to 4 carbon atoms, a phenyl group or a vinyl group, and $R''$ signifies an alkyl group having 1 to 4 carbon atoms. Methyltriethoxysilane is preferred. A partial hydrolysate of hydrocarbon trialkoxysilanes is obtained by adding water to hydrocarbon trialkoxysilanes and heating the material formed at a temperature of from 50° to 80° C. for 1 to 10 hours. The preparation of these partial hydrolysates is known per se and is described, for example, in the U.S. Pat. No. 3,451,838, in DE-OS 1 923 290 and in U.S. Pat. No. 4,006,271.

A partly hydrolysed cocondensation product containing essentially 1 mol of the hydrocarbon trialkoxysilane as the main component and from 0.05 to 1 mol of tetraalkoxy-($C_1$ to $C_4$)-silane as an additional component forms a coating having an improved hardness.

A partly hydrolysed cocondensation product of 1 mol of hydrocarbon trialkoxysilane and 0.05 mol of dialkyl-($C_1$ to $C_4$)-dialkoxy-($C_1$ to $C_4$)-silane forms a soft coating.

Additions of aqueous dispersions of colloidal silicon dioxide to the partly hydrolysed (co)condensation product of alkyltrialkoxysilane and optionally tetraalkoxysilane forms coatings having improved hardness.

The etherified methylolmelamines optionally used concomitantly are technical products which are prepared in a manner known per se. Specific examples of these compounds are hexaalkoxymethylmelamines such as hexamethoxymethylmelamine, hexaethoxymethylmelamine, hexapropoxymethylmelamine, hexaisopropoxymethylmelamine, hexabutoxymethylmelamine and hexacyclohexyloxymethylmelamine.

The etherified methylolmelamine is used preferably in a quantity of from 0 to 150 parts by weight to 100 parts by weight (calculated as $SiO_2$) of the partial hydrolysis product of the tetraalkoxysilane compound or of the colloidal silica. On the addition of more than 150 parts by weight of etherified methylolmelamine, the adhesive strength and hardness of the coating decrease. The addition of the etherified methylolmelamine imparts both hardness and flexibility to the coating.

The capped polyisocyanates added are solvent-free, stable aqueous emulsions of blocked isocyanates, optionally containing from 2 to 4% by weight of polyether, wherein the emulsifying components used are salts of diaminosulphonic acids. They are prepared by reacting any, preferably difunctional to tetrafunctional, polyisocyanates with compounds which possess groups of molecules reactive towards isocyanate groups. Suitable examples of these include secondary or tertiary alcohols, C—H acidic compounds, oximes, lactams, phenols, N-alkylamides, imides, imidazoles, triazoles or alkali bisulphites. It is preferable to use C—H acidic compounds, in particular compounds containing activated methylene groups such as, for example, dialkyl malonates, alkyl acetoacetates or acetylacetone.

The reaction of the polyisocyanate functional groups with the group of molecules reactive towards isocyanate groups is carried out in the presence of specific proportions of aromatic, aliphatic or araliphatic diaminosulphonic acids or of the alkaline or ammonium salts thereof.

The blocked polyisocyanates employed can be obtained in a reaction known per se by reacting polyisocyanates with blocking agents such as, for example, diethyl malonate or ethyl acetoacetate. The solubility or dispersibility of the blocked polyisocyanate depends on the inclusion in the addition reaction of hydrophilic components, the ionic or nonionic water-dispersing polyethylene oxide segments whereof are incorporated during formation of the polymer.

Through the incorporation of the ionic or nonionic hydrophilic groups, the blocked polyisocyanates in question on their part become hydrophilic to the point that they are soluble, or can be stably dispersed, in water or in aqueous-alcoholic solutions or formulations and are compatible with the formulations suitable for the thermoplastic coating.

The use of the blocked isocyanates described above leads to coatings having improved adhesion and elasticity, without the scratch resistance and hardness of the coating being adversely affected.

The organic solvents used in addition to acetic acid are not of crucial importance. Possible solvents here are alcohols, ketones, ethers and/or aromatic hydrocarbons. Of these solvents, ethanol and isopropanol are particularly preferred for the preparation of the coating material. The quantity of organic solvents must be sufficient completely to dissolve the partly hydrolysed compound together with the acetic acid and the rest of the additives mentioned and to adjust the concentration of the partly hydrolysed compound to 5 to 15% by weight, referred to solids and referred to the total weight of the coating material.

Any processes can be used to coat thermoplastics with the coating material, for example, dipping, spraying or casting processes. The thermoplastic bodies thus coated are then heated in order to cure the coating material.

Coating material:

Preparation of the principal components:

a) 19.8 g of glacial acetic acid, 210 g of distilled water and 227 g of isopropanol are added to 300 g of colloidal silica having a 30% by weight content of $SiO_2$. These are thoroughly mixed and then 900 g of methyltriethoxysilane is added and the mixture is heated to 60° C. with stirring. The mixture is allowed to stand for 4 hours at this temperature and then a further 1200 g of isopropanol is added. After the product has been cooled to room temperature, the faintly opaque solution is filtered.

b) 340 g of isopropanol, 190 g of tetraethoxysilane and 360 g of methyltriethoxysilane are placed in a vessel provided with a stirrer and a reflux condenser. 180 g of 0.05N hydrochloric acid is added to this mixture, which is then heated under reflux for five hours in order to carry out the cohydrolysis. After the reaction, the mixture is cooled to room temperature. A solution is obtained which contains a partial hydrolysate of tetraethoxysilane (5.1%, calculated as $SiO_2$) and a partial hydrolysate of methyltriethoxysilane (12.6%, calculated as $CH_3SiO_{1.3}$).

Prior to being used as coating material, the two components are mixed together in the ratio of 1:1 and dissolved in a mixture of 60 parts by weight of n-butanol, 40 parts by weight of acetic acid and 20 parts by weight of toluene, to which 1.5 parts by weight of the following isocyanate (1) is added.

Preparation of the blocked isocyanate (1)

370 g of diethyl malonate and 2.7 g of sodium phenolate are mixed together for 15 minutes at room temperature. 500 g of a biuretised hexamethylene diisocyanate (23.8% of NCO groups) is added and, after the exothermic reaction has subsided, stirring is continued for 3 hours at 90° C. 40 g of an ethylene oxide polyether started on n-butanol (molecular weight=2000) and 1 ml of tin(II) octoate are then added and stirring is continued for a further 3 hours at 90° C. The stirrer speed is increased, a solution of 46 g of sodium-2,4-diaminobenzenesulphonate in 150 ml of water is now added and the reaction mixture is stirred for 2 hours at 60° C. 200 ml of isopropanol is then added. A clear yellow liquid, diluted with water, is obtained. The solution contains approx. 76% by weight of solids. The content of blocked NCO groups is 7.6%.

Coating of substrates and testing of the properties of the coatings:

Plates of the dimensions 105×150×3 mm and made of a copolycarbonate based on the diphenol Ib and on bisphenol A (Apec HT KU 1-9350 having a glass temperature Tg=185° C., from Bayer AG) and, for comparison, a polycarbonate based on bisphenol A (Makrolon 3108 having Tg=148° C. from Bayer AG) were purified with isopropanol and were coated with a layer 20 μm thick by being dipped in the above-mentioned coating material at a dipping rate v=100 cm min$^{-1}$. After being aired for 10 minutes at room temperature, the coated plates were dried at elevated temperatures. The drying times and drying temperature were varied. The layer thickness of the scratch-resistant coat after drying was 5 μm.

The coated plates, after completion of curing, were stored for 2 days at room temperature and then subjected to the following tests. The results of the tests are shown in Table 1.

Strength of adhesion to the substrate material

The cured layer applied to the plate is incised crosswise down to the substrate by means of a sharp blade, so as to form 100 cells having an area of 1 mm$^2$. A cellophane adhesive tape is then pressed firmly to the lines incised crosswise and then peeled off at an angle of 90° to the applied layer. This procedure is repeated three times. The values obtained for the adhesion are divided into five classes from 0 (no delamination) to 5 (complete delamination) depending on the number of cells remaining behind (DIN 53 151).

| Plate material | Curing temperature (°C.) | Curing time (min) | Adhesion Cross-cutting/Tesafilm | |
|---|---|---|---|---|
| | | | Un-weathered | Weathered 1000 h |
| Apec KU 1-9350 | 130 | 10 | 0 | 2 |
| Apec KU 1-9350 | 150 | 30 | 0 | 1 |
| Apec KU 1-9350 | 150 | 10 | 0 | 2 |
| Apec KU 1-9350 | 170 | 10 | 0 | 0 |

-continued

| Plate material | Curing temperature (°C.) | Curing time (min) | Adhesion Cross-cutting/Tesafilm | |
|---|---|---|---|---|
| | | | Un-weathered | Weathered 1000 h |
| Makrolon 3108 | 130 | 10 | 4 | 4 |
| Makrolon 3108 | 130 | 45 | 1 | 4 |

I claim:

1. Method for coating polycarbonate moulded parts, characterised in that to the surface of a moulded body of a polycarbonate (A) formed from (1) one or more diphenols of formula (Ia)

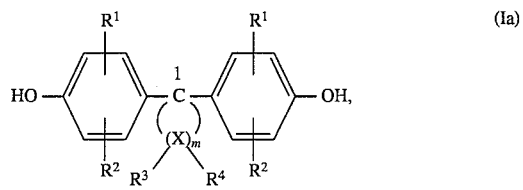

wherein $R^1$ and $R^2$ independently of one another denote hydrogen, halogen, $C_1$–$C_8$ alkyl, $C_5$–$C_6$ cycloalkyl, $C_6$–$C_{10}$ aryl, or $C_7$–$C_{12}$ aralkyl, m is 4 or 5, $R^3$ and $R^4$ are selected individually for each X and independently of one another denote hydrogen or $C_1$–$C_6$ alkyl and X denotes carbon, with the proviso that, on at least one atom X, $R^3$ and $R^4$ both denote $C_1$–$C_6$ alkyl, and 2) one or more diphenols selected from the group consisting of
2,2-bis(4-hydroxyphenyl)propane;
2,2-bis(3,5-dimethyl-4-hydroxyphenyl)propane;
2,2-bis(3,5-dichloro-4-hydroxy-phenyl)propane;
2,2-bis(3,5-dibromo-4-hydroxyphenyl)propane and
1,1-bis(4-hydroxyphenyl)-cyclohexane, at a molar ratio of (1):(2) of from 100 mol %:0 mol % to 10 mol %:90 mol %, a coating material (B), which possesses as cross-linkable components agents having acrylate, allyl, epoxide, silanol, isocyanate, anhydride or melamine functional groups or combinations thereof, is applied in a thickness of from 0.5 to 200 μm and is subsequently cured thermally and/or by irradiation.

2. Method according to claim 1, characterised in that curing is carried out at temperatures of from 130° C. to 220° C.

3. A method according to claim 1, wherein $R^1$ and $R^2$ independently of one another denote hydrogen, chlorine, bromine, $C_1$–$C_8$ alkyl, $C_5$–$C_6$ cycloalkyl, $C_6$–$C_{10}$ aryl or $C_7$–$C_{12}$ aralkyl.

4. A method according to claim 1, wherein $R^1$ and $R^2$ independently of one another denote hydrogen, halogen, $C_1$–$C_8$ alkyl, $C_5$–$C_6$ cycloalkyl, phenyl or $C_7$–$C_{12}$ aralkyl.

5. A method according to claim 1, wherein $R^1$ and $R^2$ independently of one another denote hydrogen, halogen, $C_1$–$C_8$ alkyl, $C_5$–$C_6$ cycloalkyl, $C_6$–$C_{10}$ aryl or phenyl-$C_1$–$C_4$ alkyl.

6. A method according to claim 1, wherein $R^1$ and $R^2$ independently of one another denote hydrogen, chlorine, bromine, $C_1$–$C_8$ alkyl, $C_5$–$C_6$ cycloalkyl, $C_6$–$C_{10}$ aryl or benzyl.

7. A method according to claim 1, wherein said coating material (B) further contains thermally or photochemically curing catalysts.

8. Method for coating polycarbonate moulded parts, characterised in that to the surface of a moulded body of a polycarbonate (A) formed from (1) one or more diphenols of formula (Ia)

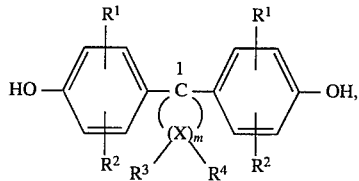

wherein $R^1$ and $R^2$ independently of one another denote hydrogen, halogen, $C_1$–$C_8$ alkyl, $C_5$–$C_6$ cycloalkyl, or $C_6$–$C_{10}$ aryl, m is 4 or 5, $R^3$ and $R^4$ are selected individually for each X and independently of one another denote hydrogen or $C_1$–$C_6$ alkyl and X denotes carbon, with the proviso that, on at least one atom X, $R^3$ and $R^4$ both denote $C_1$–$C_6$ alkyl, and 2) one or more diphenols selected from the group consisting of 2,2-bis(4-hydroxyphenyl)propane;

2,2-bis(3,5-dimethyl-4-hydroxyphenyl)propane;

2,2-bis(3,5-dichloro-4-hydroxy-phenyl)propane;

2,2-bis(3,5-dibromo-4-hydroxyphenyl)propane and 1,1-bis(4-hydroxyphenyl)-cyclohexane, at a molar ratio of (1):(2) of from 100 mol %:0 mol % to 10 mol %:90 mol %, a coating material (B), which possesses as cross-linkable components agents having acrylate, allyl, epoxide, silanol, isocyanate, anhydride or melamine functional groups or combinations thereof, is applied in a thickness of from 0.5 to 200 μm and is subsequently cured thermally and/or by irradiation.

* * * * *